United States Patent
Kishi et al.

(10) Patent No.: US 6,811,101 B2
(45) Date of Patent: Nov. 2, 2004

(54) FUEL INJECTION VALVE BODY FOR DIRECT INJECTION TYPE INTERNAL COMBUSTION ENGINE

(75) Inventors: Hirohisa Kishi, Nagoya (JP); Seiji Nonoyama, Nagoya (JP); Kyosuke Ohashi, Toyota (JP); Takuya Ikoma, Nishikamo-gun (JP); Hiromitsu Seo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 80 days.

(21) Appl. No.: 09/981,999

(22) Filed: Oct. 19, 2001

(65) Prior Publication Data

US 2002/0060256 A1 May 23, 2002

(30) Foreign Application Priority Data

Oct. 23, 2000  (JP) ........................................ 2000-322581

(51) Int. Cl.$^7$ ........................ F02M 59/00; F02M 39/00; B05B 1/30
(52) U.S. Cl. ............................... 239/533.2; 239/533.3; 239/533.11; 239/585.1; 239/585.5; 239/88
(58) Field of Search .......................... 239/533.2, 533.3, 239/533.9, 533.11, 585.1, 585.2, 585.3, 585.4, 585.5, 88, 89, 91; 251/129.15, 129.21, 127

(56) References Cited

U.S. PATENT DOCUMENTS

| | | | |
|---|---|---|---|
| 3,717,305 A | | 2/1973 | Hedges ..................... 239/288.5 |
| 4,087,050 A | * | 5/1978 | Tsuji et al. .................. 239/490 |
| 4,434,940 A | | 3/1984 | Küpper et al. |
| 4,566,634 A | | 1/1986 | Wiegand ..................... 239/410 |
| 4,894,900 A | * | 1/1990 | Rausfeisen et al. ............ 29/256 |
| 5,193,747 A | | 3/1993 | Preussner |
| 5,685,485 A | * | 11/1997 | Mock et al. ............. 239/102.2 |
| 5,850,816 A | * | 12/1998 | Ohsuga et al. .............. 123/430 |
| 5,860,394 A | | 1/1999 | Saito et al. .............. 123/41.31 |

FOREIGN PATENT DOCUMENTS

| | | |
|---|---|---|
| DE | 3113466 A1 | 10/1982 |
| DE | 19546134 C1 | 1/1997 |
| EP | 0611885 A1 | 8/1994 |
| EP | 0961024 A1 | 5/1998 |

(List continued on next page.)

OTHER PUBLICATIONS

Japanese Utility Model Application No. 51–048037 (Japanese Utility Model Laid–Open Publication No. 52–139915), Y. Yoshinori et al., Oct. 24, 1977 (in Japanese).
Japanese Utility Model Application No. 57–187266 (Japanese Utility Model Laid–Open Publication No. 58–109555), G. Buriyuune et al., Jul. 26, 1983 (in Japanese).
Notification Concerning Rejection Reason, Official Communication from the Japanese Patent Office, Patent Application No. 2000–322581; Drafting date, Dec. 15, 2003 (in Japanese with full translation in English).

*Primary Examiner*—Davis Hwu
(74) *Attorney, Agent, or Firm*—Kenyon & Kenyon (57) ABSTRACT

In a fuel injection valve body for a direct injection type internal combustion engine, an entire nozzle body tip portion is formed in a conical shape protruding from a nozzle body outer peripheral surface covered with a cap. Therefore, neither a corner portion or a recessed portion is formed on a surface of the nozzle body tip portion. This prevents heat generated by combustion from concentrating at a corner portion or a surface area from enlarging by a recessed portion, which in turn prevents heat generated by combustion from increasing the temperature of the nozzle body tip portion. Moreover, since a foremost portion of a spherical shape is formed such that it does not form a corner portion or a recessed portion in a peripheral portion of a conical shape, heat generated by combustion does not increase the temperature of the nozzle body tip portion. The temperature of a nozzle hole can therefore be prevented from increasing and accumulation of deposits can be restricted.

3 Claims, 11 Drawing Sheets

FOREIGN PATENT DOCUMENTS

| | | |
|---|---|---|
| EP | 0982493 A1 | 7/1999 |
| FR | 1178175 A1 | 1/1997 |
| GB | 0 341 105 | 1/1981 |
| JP | (A) 52-043032 | 4/1977 |
| JP | (A) 60-116848 | 6/1985 |
| JP | (A) 60-187754 | 9/1985 |
| JP | (A) 09-112392 | 4/1997 |
| JP | (A) 09-264232 | 10/1999 ......... F02M/61/18 |
| JP | (a) 2000-073919 | 3/2000 |
| WO | WO 00/49287 | 8/2000 |

* cited by examiner

FUEL INJECTION VALVE BODY FOR DIRECT INJECTION TYPE INTERNAL COMBUSTION ENGINE

INCORPORATION BY REFERENCE

The disclosure of Japanese Patent Application No. 2000-322581 filed on Oct. 23, 2000, including the specification, drawings and abstract is incorporated herein by reference in its entirety.

BACKGROUND OF THE INVENTION

1. Field of the Invention

The invention relates to a fuel injection valve body for a direct injection type internal combustion engine, in which fuel is injected directly into a combustion chamber of the internal combustion engine.

2. Description of Related Art

A direct injection type internal combustion engine, provided with a fuel injection valve that injects fuel directly into a combustion chamber, executes stratified charge combustion by injecting fuel into the combustion chamber during a compression stroke, thereby improving fuel economy. In stratified charge combustion, it is necessary that fuel injected from the fuel injection valve forms layered rich fuel-air mixture, and that the layered rich fuel-air mixture reaches an ignition plug at an ignition timing. For this reason, it is important that the shape and direction of fuel injected from a nozzle hole of the fuel injection valve body be accurately maintained to ensure a stabilized operation of the internal combustion engine.

If deposits accumulate in the nozzle hole, however, the shape and direction of fuel injected from the nozzle hole may be changed. In such cases, it becomes impossible for layered rich fuel-air mixture to reach the ignition plug at the ignition timing, resulting at times in an unstable operation of the internal combustion engine. The term "deposits" used herein refers to an oxide or a carbide produced when fuel and/or oil are burnt.

Figure 10A:
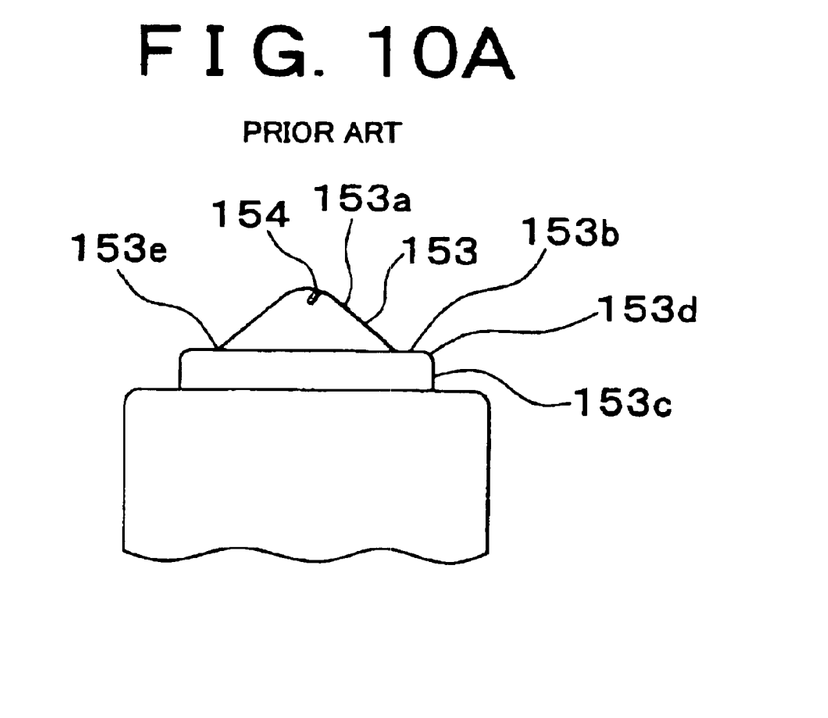
FIG. 10A is a front view showing a tip portion of a convention a fuel injection valve.
Figure 10B:
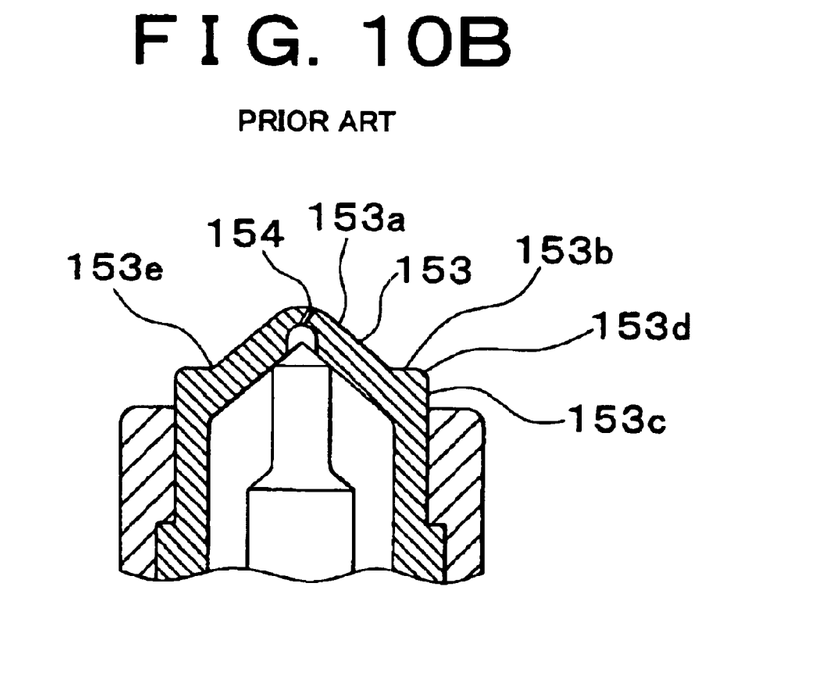
FIG. 10B is a longitudinal sectional view showing the tip portion of the conventional fuel injection valve.

Since accumulation of the deposits depends on the temperature of the nozzle hole, as described in, for example, Japanese Patent Laid-Open Publication No. 09-264232, it is important to control the temperature of the nozzle hole to ensure accurate fuel injection. However, the conventional fuel injection valve body for direct injection type internal combustion engines has been insufficient to control the temperature of the nozzle hole. For example, in a conventional fuel injection valve body for direct injection type internal combustion engines as shown in a front view in FIG. 10A and a longitudinal sectional view in FIG. 10B, only a central portion 153a of a nozzle body tip portion 153 exposed to an interior of the combustion chamber protrudes in a conical shape. On the contrary, a peripheral portion 153b is not protruded, therefore, a right-angle corner portion 153d is formed between a nozzle body outer peripheral surface 153c and the peripheral portion 153b. As a result, heat generated by combustion easily concentrates from the periphery at the corner portion 153d. The heat at the corner portion 153d is conducted to a nozzle hole 154, and the temperature thereof also easily increases, resulting in more likelihood of promoting accumulation of deposits. Moreover, a recessed portion 153e formed between the protruding central portion 153a and the peripheral portion 153b enlarges the surface, and heat generated by combustion even further increases the temperature of the corner portion 153d and the central portion 153a through the enlarged surface. This increases the temperature of the nozzle hole 154 even further, thus promoting accumulation of deposits.

Figure 11A:
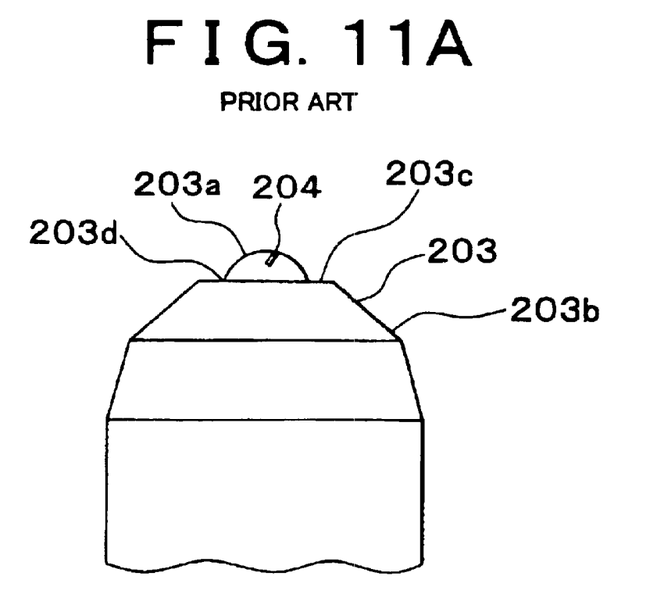
FIG. 11A is a front view showing a tip portion of a second conventional fuel injection valve.
Figure 11B:
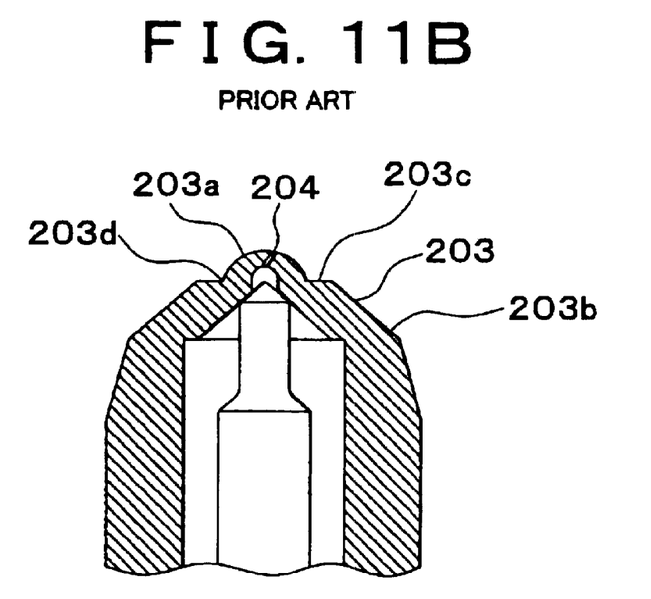
FIG. 11B is a longitudinal sectional view showing the tip portion of the second conventional fuel injection valve.

Another conventional arrangement is shown in a front view in FIG. 11A and a longitudinal sectional view in FIG. 11B, in which an entire nozzle body tip portion 203 exposed to an interior of the combustion chamber is protruded in a conical shape. However, a central portion 203a is further protruded from a tip surface 203c of a peripheral portion 203b. Therefore, a recessed portion 203d is formed between the protruding central portion 203a and the tip surface 203c of the peripheral portion 203b. This results in that heat generated by combustion even further increases the temperatures of the peripheral portion 203b and the central portion 203a through a surface enlarged by the recessed portion 203d. This causes a problem that the temperature of the nozzle hole 204 easily increases, thus promoting accumulation of deposits.

SUMMARY OF THE INVENTION

In order to solve the foregoing problems, it is an object of the invention to provide a fuel injection valve body for a direct injection type internal combustion engine that can control the temperature of a nozzle hole.

To achieve the foregoing object a fuel injection valve body for a direct injection type internal combustion engine injects fuel directly into a combustion chamber of the internal combustion engine, according to one aspect of the invention, is shaped such that an entire nozzle body tip portion formed with a nozzle hole and exposed to an interior of the combustion chamber is formed into a protruded shape without forming a corner portion or a recessed portion on a surface thereof.

If the nozzle body tip portion is not formed such that the entire nozzle body tip portion is protruded and free from a corner portion, heat generated by combustion tends to concentrate at the corner portion. The temperature of the nozzle hole, therefore, tends to increase because of heat conduction from the corner portion, thus promoting accumulation of deposits. When there is a recessed portion on the surface thereof, heat generated by combustion increases the temperature of the nozzle body tip portion is conducted from the surface enlarged by the recessed portion and, which results in easily increasing the temperature of the nozzle hole. This again in turn promotes accumulation of deposits.

Contrary to that, if the entire nozzle body tip portion of the fuel injection valve body is formed into a protruded shape without forming a corner portion or a recessed portion on the surface thereof, no corner portions are formed and the surface is not unnecessarily enlarged. As a result, the temperature of the nozzle hole can be prevented from increasing and accumulation of deposits can be restricted.

To achieve the foregoing object, a fuel injection valve body for a direct injection type internal combustion engine that injects fuel directly into a combustion chamber of the internal combustion engine may comprise a nozzle body tip portion which forms a nozzle hole therein and is exposed to an interior of the combustion chamber, and a cap disposed on a periphery of the nozzle body so as to secure the nozzle body onto a main body side of the fuel injection valve body. In this arrangement, a continuous tip portion is formed of the nozzle body tip portion and tip of the cap. The entire continuous tip portion is formed in a protruded shape without forming a corner portion or a recessed portion on a surface thereof.

The continuous tip portion prevents the temperature of the tip portion of the cap from increasing, thus preventing the temperature of the nozzle body tip portion from increasing through heat conduction from the tip portion of the cap. Therefore, the temperature of the nozzle hole can be prevented from increasing and accumulation of deposits can be restricted.

To achieve the foregoing object, according to a yet further aspect of the invention, a fuel injection valve body for a direct injection type internal combustion engine that injects fuel directly into a combustion chamber of the internal combustion engine may be provided, wherein a part of a nozzle body tip portion, in which a nozzle hole is formed and which is exposed to an interior of the combustion chamber, is covered through a gap with a tip portion of a cap, which is disposed on a periphery of the nozzle body so as to secure the nozzle body onto a main body side.

The arrangement, in which a part of the nozzle body tip portion is covered with the tip portion of the cap through the gap, reduces a part of the nozzle body tip portion that is exposed to combustion flame, which prevents the temperature of the nozzle body tip portion from increasing. In addition, thanks to the gap, heat is not directly conducted to the nozzle body tip portion even when the temperature of the tip portion of the cap increases, which effectively prevents the temperature of the nozzle body tip portion from increasing caused by heat transfer from the tip portion of the cap. Therefore, the temperature of the nozzle hole can be prevented from increasing and accumulation of deposits can be restricted.

BRIEF DESCRIPTION OF THE DRAWINGS

The above and other objects, features, advantages, technical and industrial significance of this invention will be better understood by reading the following detailed description of preferred embodiments of the invention, when considered in connection with the accompanying drawings, in which:

[FIG. 1]

[FIG. 2A]

[FIG. 2B]

[FIG. 3A]

[FIG. 3B]

[FIG. 4A]

[FIG. 4B]

[FIG. 5A]

[FIG. 5B]

[FIG. 6A]

[FIG. 6B]

[FIG. 7A]

[FIG. 7B]

[FIG. 8A]

[FIG. 8B]

[FIG. 9A]

[FIG. 9B]

[FIG. 10A]

[FIG. 10B]

[FIG. 11A]

[FIG. 11B]

DESCRIPTION OF THE PREFERRED EMBODIMENTS

In the following description and the accompanying drawings, the invention will be described in more detail in terms of preferred embodiments.

[A First Embodiment]

Figure 1:
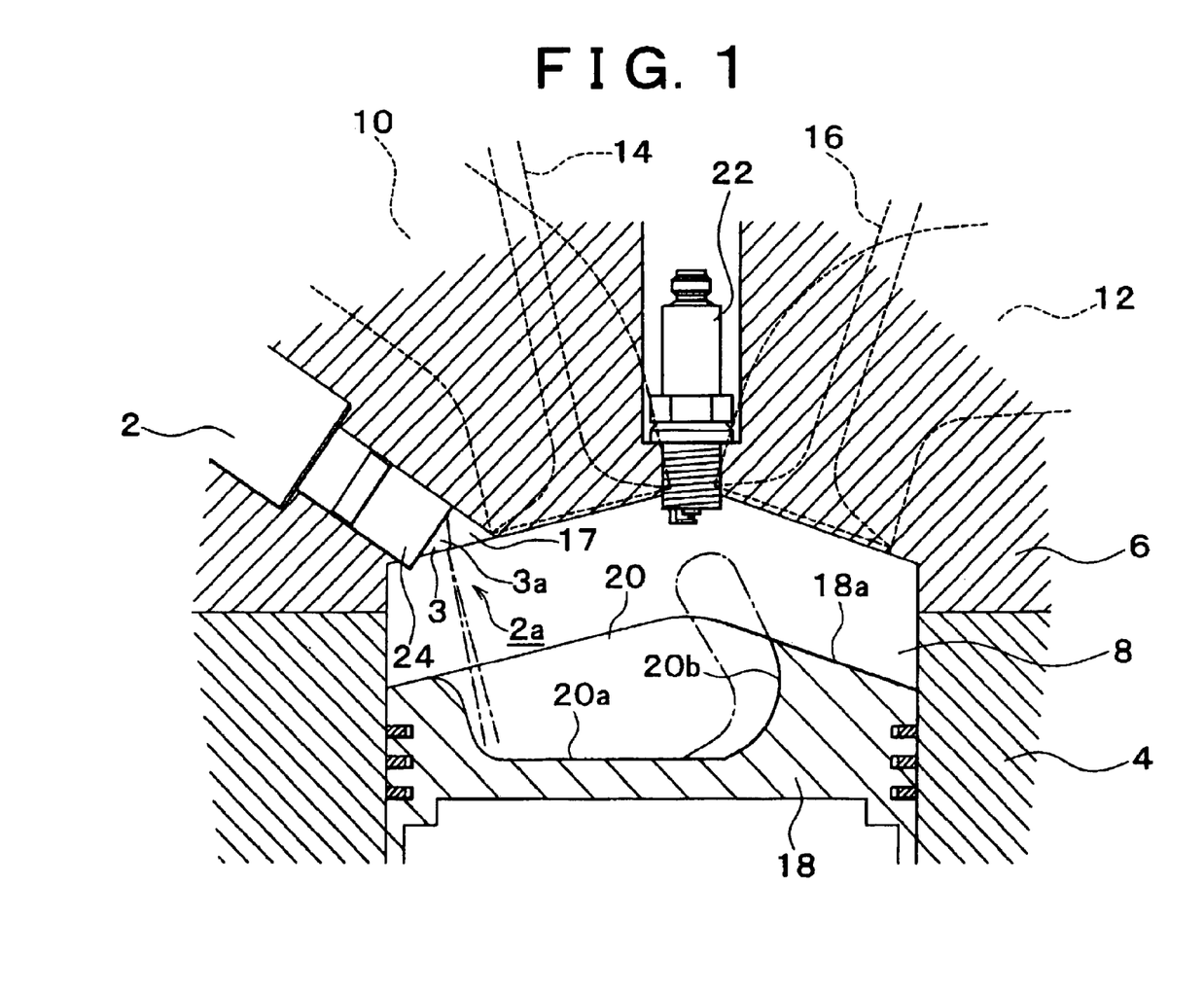
FIG. 1 is a schematic longitudinal sectional view showing a direct injection type gasoline engine to which a fuel injection valve according to a first embodiment of the invention is mounted.

FIG. 1 is a schematic longitudinal sectional view showing a direct injection type gasoline engine to which a fuel injection valve 2 according to a first embodiment of the invention is mounted. An intake port 10 and an exhaust port 12 are connected to a combustion chamber 8 formed inside a cylinder block 4 and a cylinder head 6 as shown by dashed lines. Two intake ports 10 and two exhaust ports 12 are provided for each cylinder, and each of the intake ports 10 and the exhaust ports 12 is opened and closed by an intake valve 14 and an exhaust valve 16, respectively.

The fuel injection valve 2 is mounted in a mounting hole 17 formed in the cylinder head 6 at a location between the two intake ports 10. A tip portion 2a of the fuel injection valve 2 is exposed to an interior of the combustion chamber 8. According to this arrangement, the fuel injection valve 2 is mounted such that it can directly inject fuel into the combustion chamber 8. In the fuel injection valve 2, a nozzle hole is formed in a tip portion 3a so that an atomized mist of fuel of a relatively thin sector shape is injected. A cavity 20 is formed in a top face 18a of a piston 18. In stratified charge combustion, fuel is injected from the fuel injection valve 2 into this cavity 20 in a latter half of a compression stroke as shown by the chain line in the figure. The fuel then advances by making use of penetration force thereof along a bottom wall 20a and a side wall 20b of the cavity 20. As the fuel advances, it absorbs heat and gradually vaporizes, and is eventually deflected by the side wall 20b of the cavity 20 towards a direction of an ignition plug 22 installed on a side of the cylinder head 6. A combustible fuel-air mixture having a good ignition performance is thereby formed around the ignition plug 22 at an ignition timing of stratified charge combustion, thus stratified combustion is enabled.

Figure 2A:
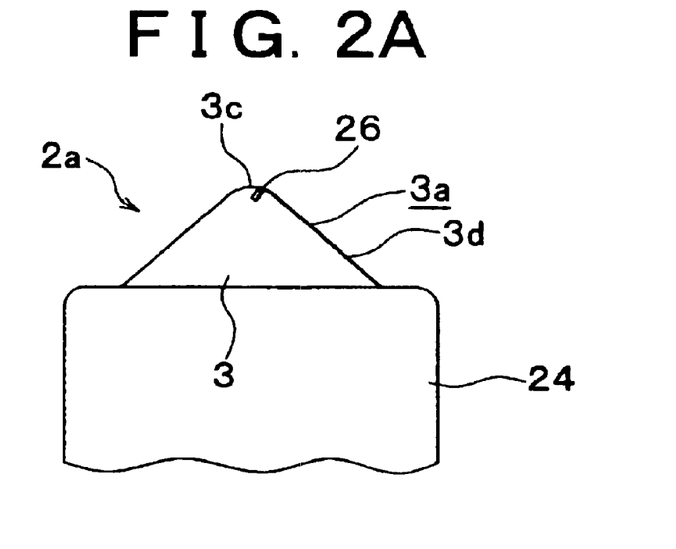
FIG. 2A is a front view showing a tip portion of the fuel injection valve according to the first embodiment of the invention.
Figure 2B:
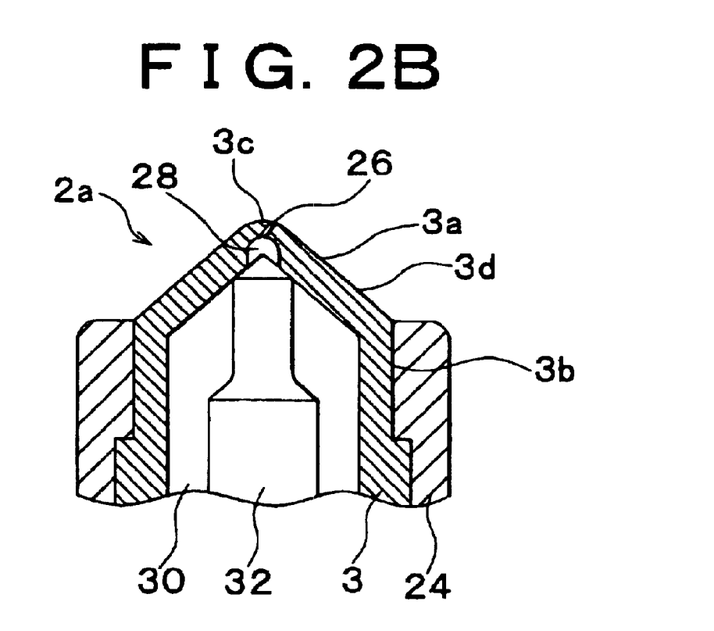
FIG. 2B is a longitudinal sectional view showing the tip portion of the fuel injection valve according to the first embodiment of the invention.

FIGS. 2A and 2B show a structure of the tip portion 2a of the fuel injection valve 2. FIG. 2A is a front view and FIG. 2B is a longitudinal sectional view. A cap 24 is fitted into an outer periphery of the nozzle body 3. Though not shown, a base portion side of the cap 24 is mounted onto a main body side of the fuel injection valve 2. This causes the cap 24 to secure the nozzle body 3 on the main body side of the fuel injection valve 3.

The entire tip portion 3a of the nozzle body 3 exposed to the interior of the combustion chamber 8 protrudes in a conical shape directly from an outer peripheral surface 3b of the nozzle body. A foremost portion 3c of the nozzle body tip portion 3a is formed into a spherical shape. The spherical foremost portion 3c and a conical peripheral portion 3d are connected without forming a recessed portion (153e, 203d) described in the conventional examples (FIGS. 10 and 11).

A nozzle hole 26 is formed in the foremost portion 3c of the nozzle body 3 at angles with respect to an axial direction of the fuel injection valve 2 to ensure that fuel is injected in a required angle. The nozzle hole 26 is connected to a fuel supply passage 30 via a cavity 28 formed inside the nozzle body 3, through which fuel under high pressure is supplied. A needle 32 disposed inside the nozzle body 3 is driven by an electromagnetic drive mechanism inside the fuel injection valve 2 and opens and closes the fuel injection valve 2, with a periphery of the cavity 28 functioning as the seat portion thereof.

The following effects can be obtained from the first embodiment described as above.

(i) Since the entire nozzle body tip portion 3a protrudes in a conical shape from the nozzle body outer peripheral surface 3b covered with the cap 24, no corner portions or recessed portions are formed on a surface thereof. Therefore, heat generated by combustion does not concentrate at a corner portion, or a surface area is not enlarged by a recessed portion, whereby heat generated by combustion does not increase the temperature at the nozzle body tip portion 3a.

Likewise, since the spherical foremost portion 3c is formed such that it does not form a corner portion or recessed portion in the conical peripheral portion 3d, heat generated by combustion increases the temperature of the nozzle body tip portion 3a. This effectively prevents the temperature of the nozzle hole 26 from increasing and deposits from accumulating.

[A Second Embodiment]

Figure 3A:
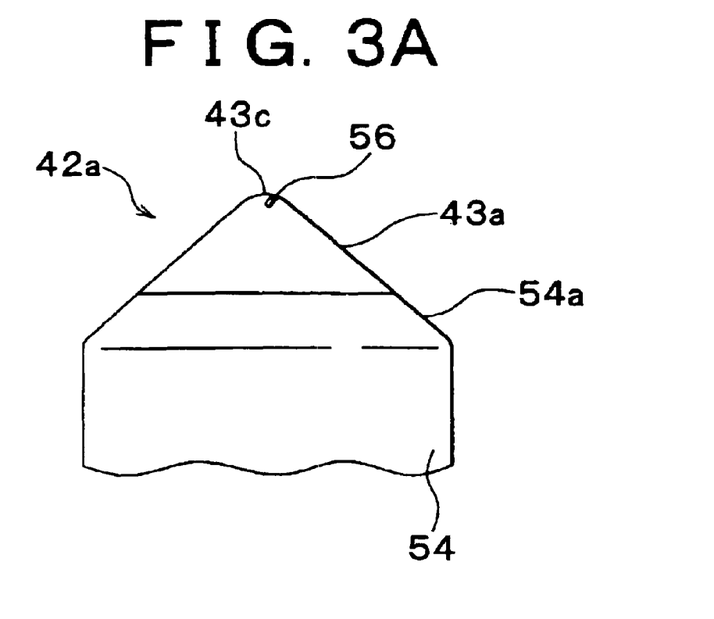
FIG. 3A is a front view showing a tip portion of the fuel injection valve according to a second embodiment of the invention.
Figure 3B:
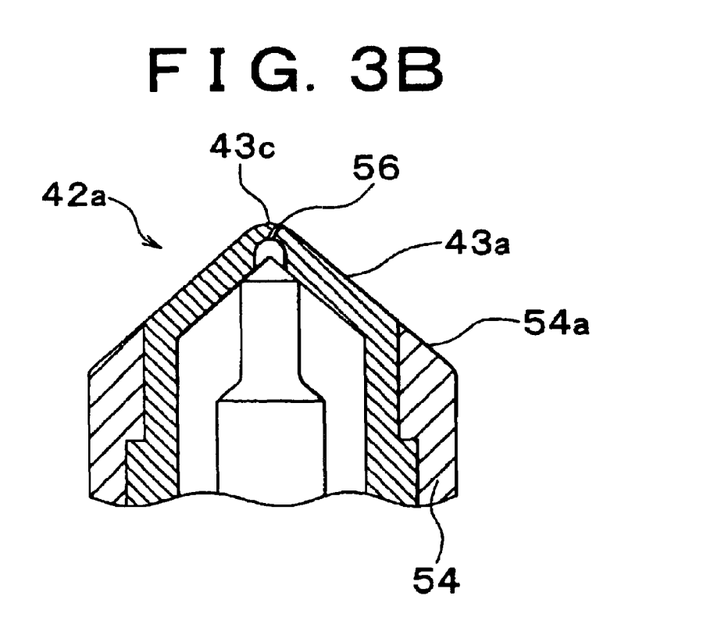
FIG. 3B is a longitudinal sectional view showing the tip portion of the fuel injection valve according to the second embodiment of the invention.

FIGS. 3A and 3B show a structure of a tip portion 42a of the fuel injection valve body according to a second embodiment of the invention. FIG. 3A is a front view and FIG. 3B is a longitudinal sectional view. The second embodiment differs from the first embodiment in that a tip portion 54a of a cap 54 is formed with a nozzle body tip portion 43a into a continuous tip portion of a conical shape and the entire continuous tip portion protruding without forming a recessed portion on a surface thereof. Other constructions of the second embodiment are the same as those of the first embodiment, including a foremost portion 43c of the nozzle body tip portion 43a formed into a spherical shape.

The following effects can be obtained from the second embodiment described as above.

(i) The same effects as those described in (i) of the first embodiment can be generated.

(ii) Since the tip portion 54a of the cap 54 is formed with the nozzle body tip portion 43a into a continuous tip portion, it even further prevents heat from concentrating at the tip portion 54a of the cap 54 and the temperature of the nozzle hole 56 from increasing through heat transfer from the cap 54 side. As a result, the effect of preventing accumulation of deposits is even more enhanced.

[A Third Embodiment]

Figure 4A:
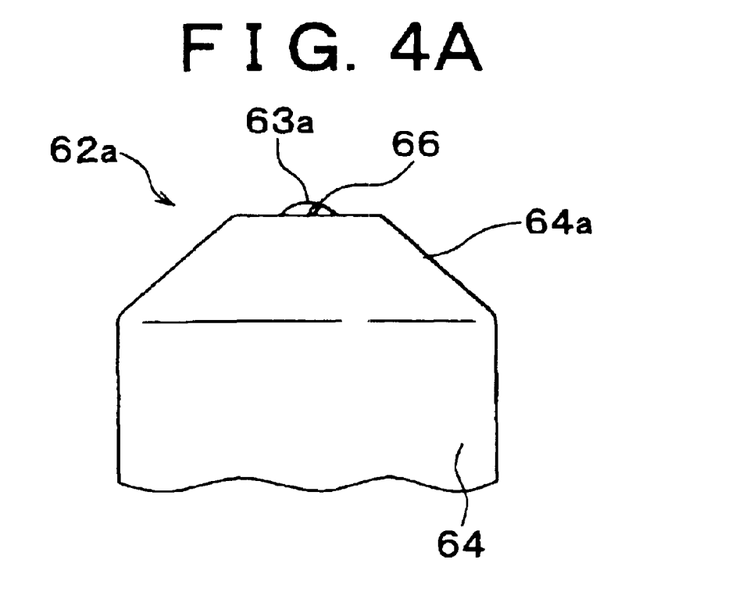
FIG. 4A is a front view showing a tip portion of the fuel injection valve according to a third embodiment of the invention.
Figure 4B:
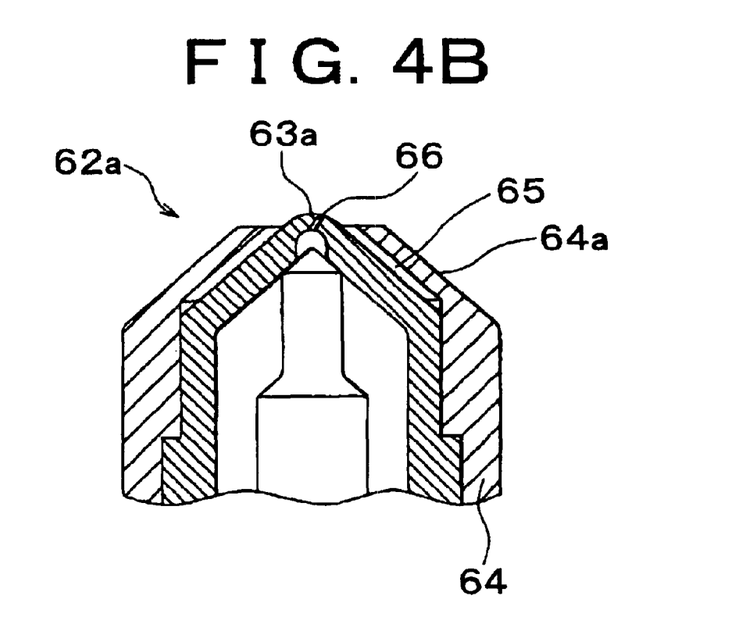
FIG. 4B is a longitudinal sectional view showing the tip portion of the fuel injection valve according to the third embodiment of the invention.

FIGS. 4A and 4B show a structure of a tip portion 62a of the fuel injection valve body according to a third embodiment of the invention. FIG. 4A is a front view and FIG. 4B is a longitudinal sectional view. The third embodiment differs from the first embodiment in that a tip portion 64a of a cap 64 extends along a nozzle body tip portion 63a and covers a part of the nozzle body tip portion 63a through a gap 65. Other constructions of the third embodiment are the same as those of the first embodiment.

The following effects can be obtained from the third embodiment described as above.

(i) The same effects as those described in (i) of the first embodiment can be generated.

(ii) Since a part of the nozzle body tip portion 63a is covered with the tip portion 64a of the cap 64 through the gap 65, a smaller area in the nozzle body tip portion 63a is exposed to a combustion flame. This prevents the temperature of the nozzle body tip portion 63a from increasing. Even if the temperature of the tip portion 64a of the cap 64 increases, the gap 65 blocks a direct transfer of heat to the nozzle body tip portion 63a, which prevents the temperature of the nozzle body tip portion 63a from increasing. As a result, the temperature of the nozzle hole 66 can be prevented from increasing and accumulation of deposits can be restricted.

[A Fourth Embodiment]

Figure 5A:
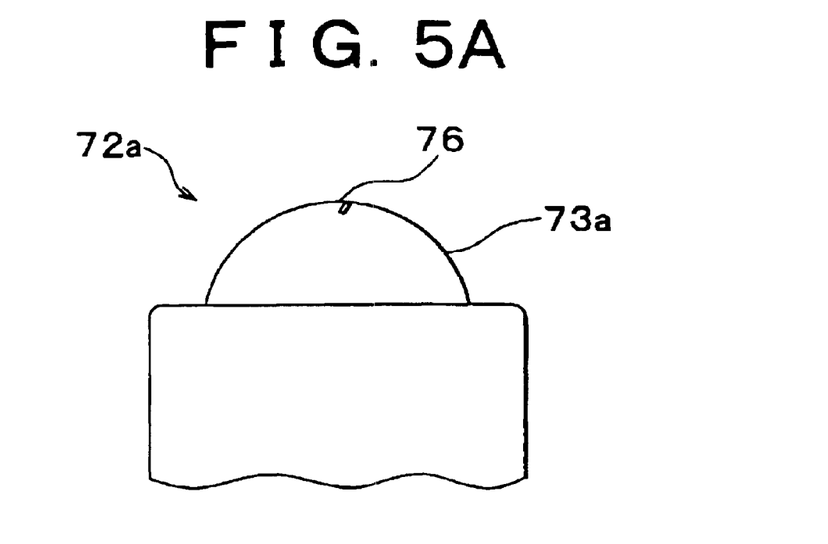
FIG. 5A is a front view showing a tip portion of the fuel injection valve according to a fourth embodiment of the invention.
Figure 5B:
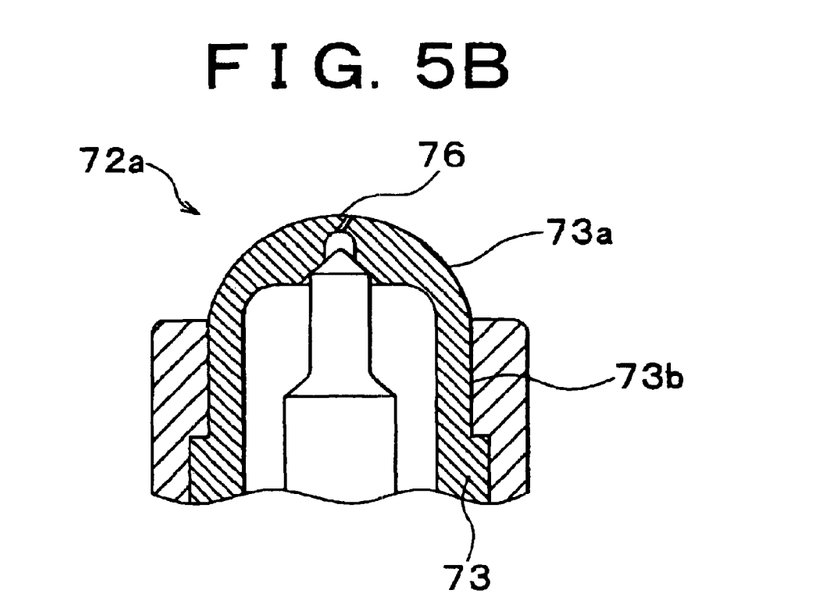
FIG. 5B is a longitudinal sectional view showing the tip portion of the fuel injection valve according to the fourth embodiment of the invention.

FIGS. 5A and 5B show a structure of a tip portion 72a of the fuel injection valve body according to a fourth embodiment of the invention. FIG. 5A is a front view and FIG. 5B is a longitudinal sectional view. The fifth embodiment differs from the first embodiment in that the entire nozzle body tip portion 73a protrudes in a spherical shape. Namely, it protrudes directly from an outer peripheral surface 73b of the nozzle body 73 in a spherical shape. A nozzle hole 76 is opened near an apex of the nozzle body tip portion 73a. Other constructions of the fourth embodiment are the same as those of the first embodiment.

The following effects can be obtained from the fourth embodiment described as above.

(i) Since the entire nozzle body tip portion 73a protrudes in a spherical shape directly from the outer peripheral surface 73b of the nozzle body 73, a corner portion or a recessed portion cannot be formed on a surface thereof. The same effects as those described in (i) of the first embodiment can therefore be generated.

[A Fifth Embodiment]

Figure 6A:
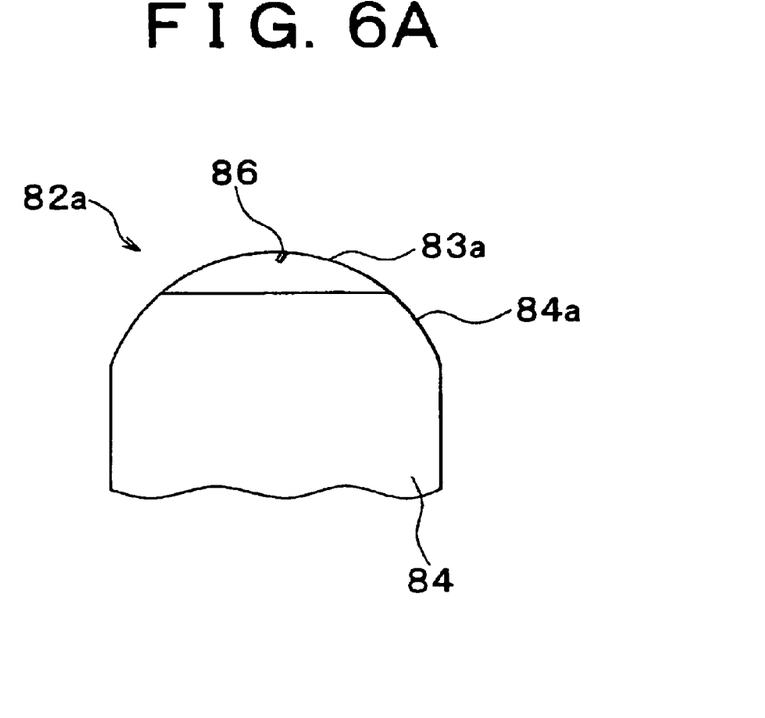
FIG. 6A is a front view showing a tip portion of the fuel injection valve according to a fifth embodiment of the invention.
Figure 6B:
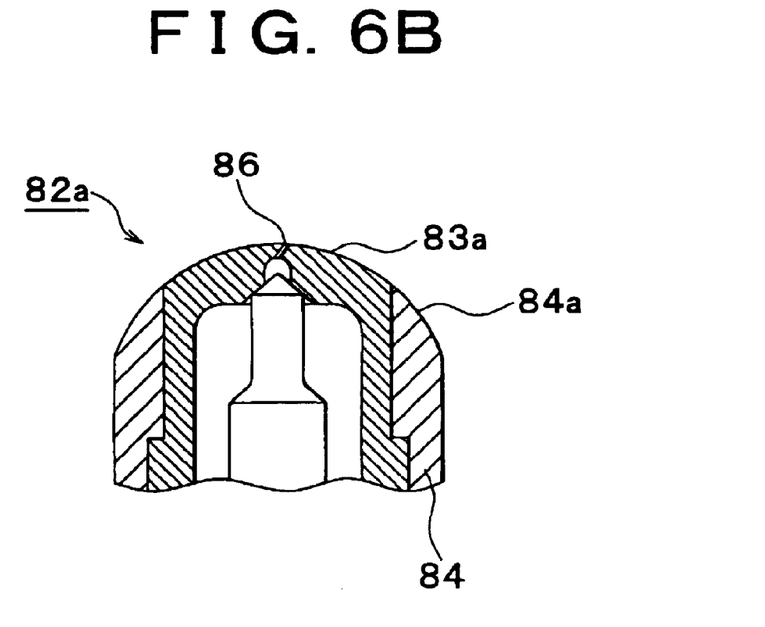
FIG. 6B is a longitudinal sectional view showing the tip portion of the fuel injection valve according to the fifth embodiment of the invention.

FIGS. 6A and 6B show a structure of a tip portion 82a of the fuel injection valve body according to a fifth embodiment of the invention. FIG. 6A is a front view and FIG. 6B is a longitudinal sectional view. The fifth embodiment differs from the first embodiment in that a tip portion 84a of a cap 84 and a nozzle body tip portion 83a form a continuous tip portion, and the entire continuous tip portion protrudes in a spherical shape. A nozzle hole 86 is opened near an apex of the nozzle body tip portion 83a. Other constructions of the fifth embodiment are the same as those of the first embodiment.

The following effects can be obtained from the fifth embodiment described as above.

(i) The same effects as those described in (i) of the first embodiment and in (ii) of the second embodiment can be generated.

[A Sixth Embodiment]

Figure 7A:
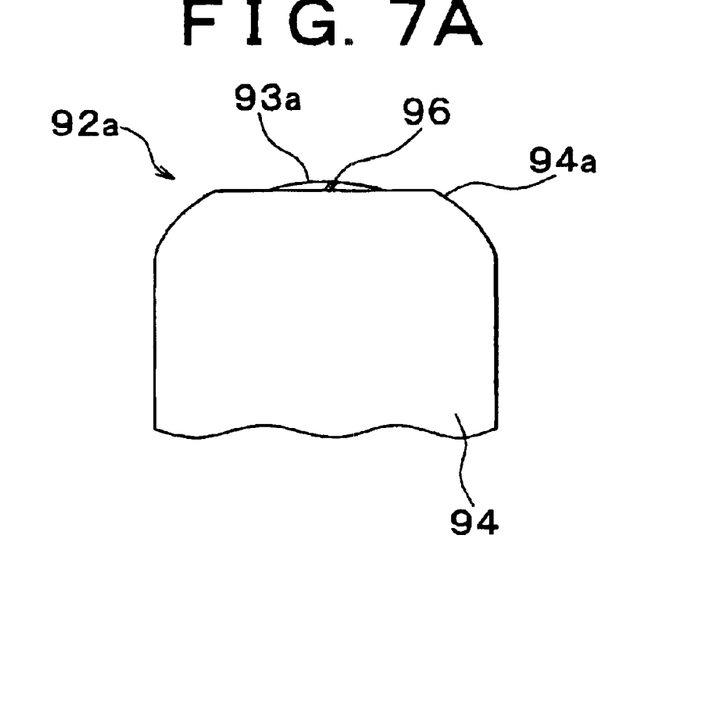
FIG. 7A is a front view showing a tip portion of the fuel injection valve according to a sixth embodiment of the invention.
Figure 7B:
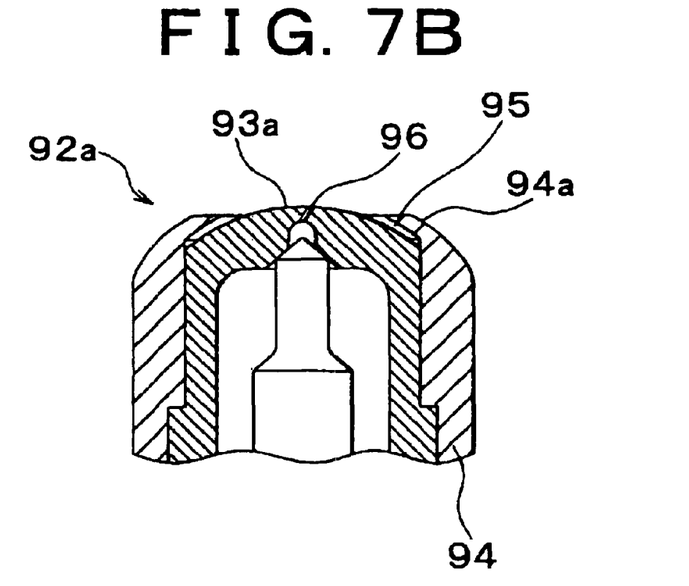
FIG. 7B is a longitudinal sectional view showing the tip portion of the fuel injection valve according to the sixth embodiment of the invention.

FIGS. 7A and 7B show a structure of a tip portion 92a of the fuel injection valve body according to a sixth embodiment of the invention. FIG. 7A is a front view and FIG. 7B is a longitudinal sectional view. The sixth embodiment differs from the fifth embodiment in that a tip portion 94a of a cap 94 extends along a nozzle body tip portion 93a and covers a part of the nozzle body tip portion 93a through a gap 95. A nozzle hole 96 is opened near an apex of the nozzle body tip portion 93a. Other constructions of the sixth embodiment are the same as those of the third embodiment.

The following effects can be obtained from the sixth embodiment described as above.

(i) The same effects as those described in (i) of the first embodiment and in (ii) of the third embodiment can be generated.

[A Seventh Embodiment]

Figure 8A:
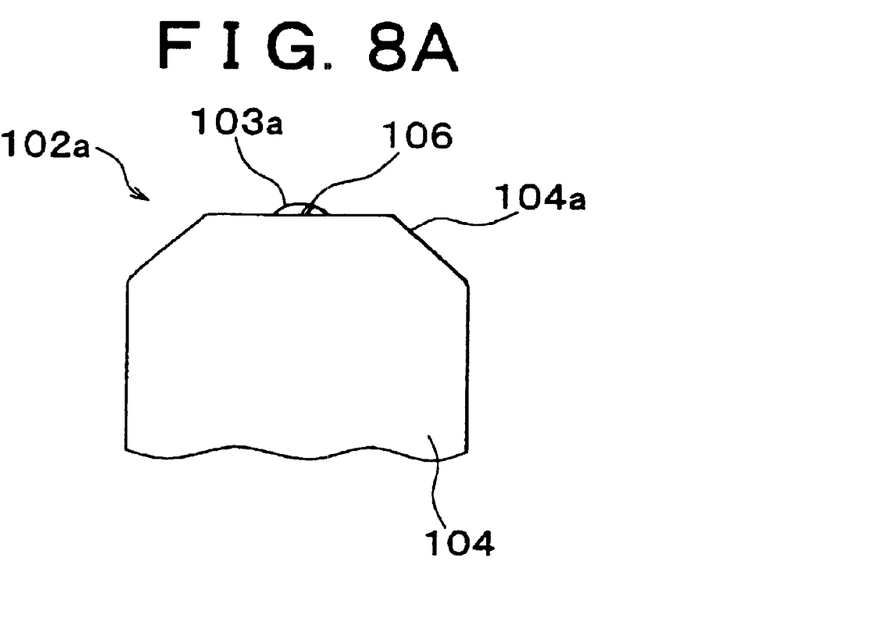
FIG. 8A is a front view showing a tip portion of the fuel injection valve according to a seventh embodiment of the invention.
Figure 8B:
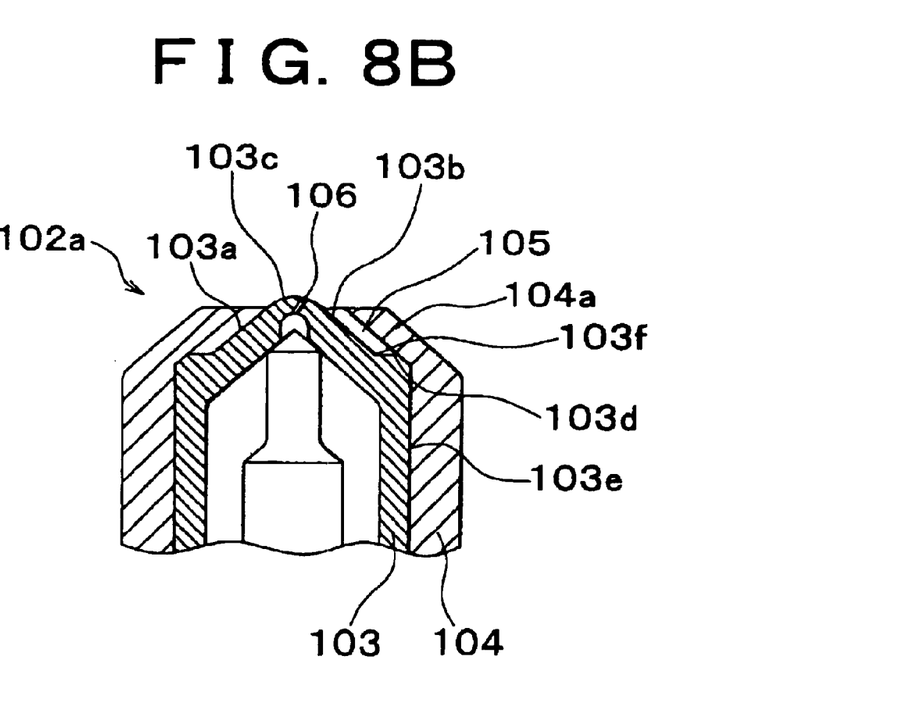
FIG. 8B is a longitudinal sectional view showing the tip portion of the fuel injection valve according to the seventh embodiment of the invention.

FIGS. 8A and 8B show a structure of a tip portion 102a of the fuel injection valve body according to a seventh embodiment of the invention. FIG. 8A is a front view and FIG. 8B is a longitudinal sectional view. The seventh embodiment differs from the third embodiment in that the entire nozzle body tip portion 103a does not protrude, but only a central portion 103b protrudes in a conical shape and a foremost portion 103c thereof forms a spherical shape, though a peripheral portion 103d is a plane perpendicular to an outer peripheral surface 103e. As a result, a recessed portion 103f is formed in the nozzle body tip portion 103a. The recessed portion 103f is covered with a tip portion 104a of a cap 104 through a gap 105. Other constructions of the seventh embodiment are the same as those of the third embodiment.

The following effects can be obtained from the seventh embodiment described as above.

(i) A part of the nozzle body tip portion 103a, particularly, in this embodiment, the peripheral portion 103d and the recessed portion 103f are covered with the tip portion 104a of the cap 104 through the gap 105. This reduces an area, which is exposed directly to a combustion flame, of the nozzle body tip portion 103a. Particularly, either the peripheral portion 103d or the recessed portion 103f is not exposed directly to a combustion flame. This prevents the temperature of the nozzle body tip portion 103a from increasing. Even if the temperature of the tip portion 104a of the cap 104 increases, the gap 105 blocks a direct transfer of heat to the nozzle body tip portion, which prevents the temperature of the nozzle body tip portion 103a from increasing. The temperature of a nozzle hole 106 can be prevented from increasing and accumulation of deposits can be restricted.

[An Eighth Embodiment]

Figure 9A:
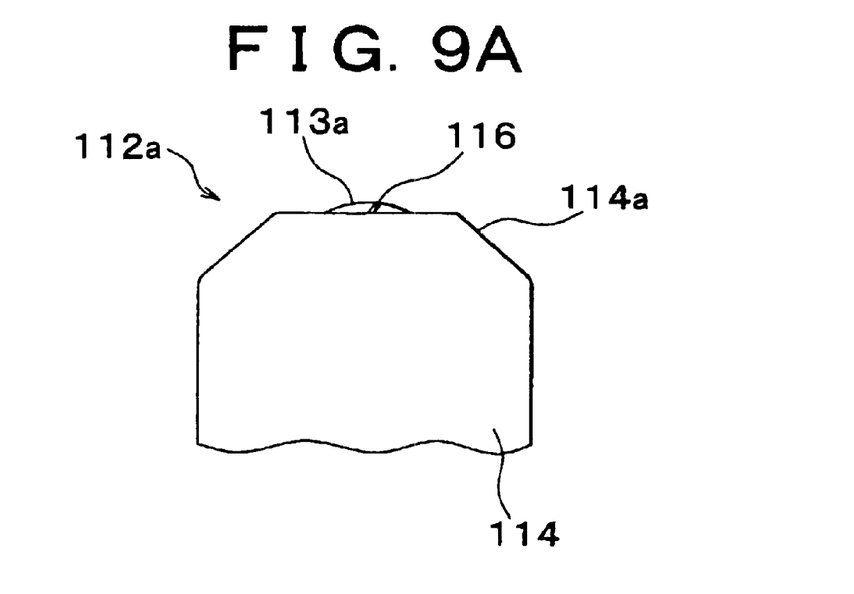
FIG. 9A is a front view showing a tip portion of the fuel injection valve according to a eighth embodiment of the invention.
Figure 9B:
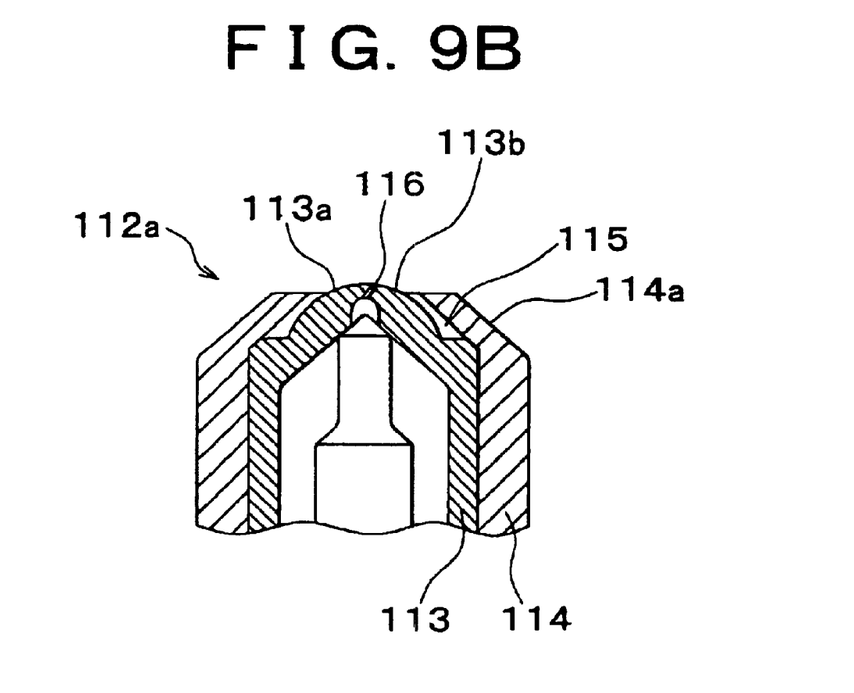
FIG. 9B is a longitudinal sectional view showing the tip portion of the fuel injection valve according to the eighth embodiment of the invention.

FIGS. 9A and 9B show a structure of a tip portion 112a of the fuel injection valve body according to an eighth embodiment of the invention. FIG. 9A is a front view and FIG. 9B is a longitudinal sectional view. The eight embodiment differs from the seventh embodiment in that a central portion 113b of a nozzle body tip portion 113a, which is covered with a tip portion 114a of a cap 114 through a gap 115, protrudes in a spherical shape. A nozzle hole 116 is opened near an apex of the nozzle body tip portion 113a. Other constructions of the eighth embodiment are the same as those of the seventh embodiment.

The following effects can be obtained from the eighth embodiment described as above.

(i) The same effects as those described in (i) of the seventh embodiment can be generated.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A fuel injection valve body for a direct injection type internal combustion gasoline engine that injects fuel directly into a combustion chamber of the gasoline engine and executes a stratified charge combustion by forming high concentration stratified mixture air around an ignition plug, comprising:

a nozzle body tip portion, wherein the nozzle body tip portion is formed with a nozzle hole to inject a fuel directly to the combustion chamber and formed in a protruded shape without forming a corner portion or a recessed portion on a surface thereof, the nozzle hole being exposed to the combustion chamber, and a cap disposed on an outer periphery of the nozzle body tip so as to secure the nozzle body tip to a main body of the fuel injection valve, and wherein a gap is formed between the nozzle body and a tip portion of the cap.

2. The fuel injection valve body for a direct injection type internal combustion engine according to claim 1, wherein:

the nozzle body tip protrudes in a conical shape and the tip of the conical shape is spherical.

3. The fuel injection valve body for a direct injection type internal combustion engine according to claim 1, wherein:

the nozzle body tip is spherical.

\* \* \* \* \*